(12) United States Patent
Kimbara et al.

(10) Patent No.: US 6,312,843 B1
(45) Date of Patent: Nov. 6, 2001

(54) FUEL CELL APPARATUS

(75) Inventors: Masahiko Kimbara; Takashi Ban; Hidehito Kubo; Hirohisa Katoh, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/393,259

(22) Filed: Sep. 10, 1999

(30) Foreign Application Priority Data

Sep. 16, 1998 (JP) .................................................. 10-261352

(51) Int. Cl.⁷ ...................................................... H01M 8/04
(52) U.S. Cl. .................. 429/25; 429/13; 429/17; 429/19; 429/34
(58) Field of Search ................... 429/13, 17, 19, 429/25, 34

(56) References Cited

U.S. PATENT DOCUMENTS 5,645,950 * 7/1997 Benz et al. .............................. 429/13
5,981,096 * 11/1999 Hornburg et al. ...................... 429/17
6,077,620 * 7/2000 Pettit ........................................ 429/26

* cited by examiner

Primary Examiner—Carol Chaney
Assistant Examiner—Dah-Wei D. Yuan
(74) Attorney, Agent, or Firm—Morgan & Finnegan, LLP

(57) ABSTRACT

This invention relates to a fuel cell apparatus in which a discharge gas having a pressure energy even after an oxygen has been consumed at the fuel cell is expanded at an expander to collect the pressure energy in the discharge gas as a mechanical energy for assisting driving of a compressor.

A clutch (20) is disposed between the electric motor (16) and the expander (15) for connecting/interrupting the expander with/from the electric motor, and a control means (21, 22) for controlling the clutch is provided. The control means detects a pressure in the gas discharge tube (13) between the fuel cell (10) and the expander (15), to interrupt the clutch as long as a detected pressure is lower than a predetermined value, and to connect the clutch when the detected pressure becomes higher than the predetermined value.

9 Claims, 3 Drawing Sheets

FUEL CELL APPARATUS

BACKGROUND OF THE INVENTION

1. Field of the Invention

This invention relates to a fuel cell apparatus, more particular, it relates to the fuel cell apparatus in which a discharge gas having a pressure energy even after an oxygen has been consumed at the fuel cell is expanded at an expanding machine (expander) to collect the pressure energy in the discharge gas as a mechanical energy for assisting driving of a compressor.

2. Related Art

In this kind of fuel cell apparatus, the fuel cell is provided with an air supply tube extending from a compressed air source to the fuel cell, and a discharge gas tube extending from the fuel cell to an atmosphere; the compressor is disposed on the air supply tube, and the expander is disposed on the gas discharge tube respectively. The compressor is driven by an electric motor.

For example, a fuel cell apparatus disclosed in Japanese Unexamined (koukai) Patent Application No. 7-14599 which corresponds to U.S. Pat. Nos. 5,434,016 and 5,645,950, as shown in FIG. 3, includes a fuel cell 50 provided with an air supply tube 51 and a gas discharge tube 52, a compressor 53 disposed on the air supply tube 51, an expander 54 disposed on the gas discharge tube 52, and an electric motor 56 for driving the compressor 53. The air supplied from the air supply tube 51 is compressed to a predetermined pressure value by the compressor 53 and then is supplied to the fuel cell 50, to consume oxygen contained therein at the fuel cell 50. The discharge gas of which oxygen is consumed at the fuel cell 50 is then discharged through the gas discharge tube 52, expanded by the expander 54 down near to an atmospheric pressure. The expander 54 is disposed coaxially with the compressor 53 and is connected thereto by a common shaft 57 to be driven by the electric motor 56. In FIG. 3, reference numerals 58 and 59 each show a water separator, 61 shows a pump, 62 shows a nozzle, and 63 shows a tank, respectively.

This fuel cell apparatus intends to utilize the pressure energy remaining in the discharge gas discharged from the fuel cell 50 for assisting driving or power of the compressor 53. That is, the pressure energy of the discharge gas is converted to mechanical energy (driving force) by the expander 54, and the driving force is transmitted via the common shaft 57 to the compressor 53 to assist driving of the compressor 53 by the electric motor 56.

However, the assisting drive force for the compressor 53 by the expander 54 can be obtained only after a discharge pressure in the gas discharge tube 52 increases up to a predetermined value (rating absorb pressure of the expander 54), which is realized with a lapse of some time after an operation start of the fuel cell. In other words, before the discharge pressure in the gas discharge tube 52 reaches the predetermined value such as just after start of the fuel cell, expander 54 can not be operated by the discharge gas, so it is operated by the electric motor 56 to expand the discharge gas compulsorily down to below the atmospheric pressure. This means however not only the expander 54 can not collect mechanical energy but the expander 54 consumes electric energy of the electric motor 56, in other words, a negative torque is transmitted from the expander 54 to the electric motor 56.

In view of the above, in this conventional fuel cell apparatus, a swing plate valve or an air register 64 is provided between the fuel cell 50 and the expander 54 on the gas discharge tube (upstream of the expander 54), to introduce the atmosphere into the gas discharge tube 52, when the pressure in the gas discharge tube 52 is negative, for increasing the pressure therein.

However, even after the swing plate valve 64 is opened, the rotation of the expander 54 by the electric motor 56 continues until the pressure in the gas discharge tube 52 reaches the predetermined value, and the electric energy of the electric motor 56 is consumed for driving the expander 54. In addition, due to the atmosphere introduced through the swing plate valve 64 by the expander 54, amount of the air in the gas discharge tube 52 and the expander 54 increases, so that necessary time for increasing the pressure of the discharge gas in the discharge gas 52 is meaninglessly extended.

SUMMARY OF THE INVENTION

The present invention firstly intends to provide a fuel cell apparatus, in which the driving force of the electric motor is not used for driving the expander before the pressure in the gas discharge tube reaches the predetermined value.

The present invention secondarily intends to provide a fuel cell apparatus in which the pressure energy remaining in the discharge gas is converted to mechanical energy by the expander for assisting the driving of the compressor, after the pressure in the gas discharge tube reaches the predetermined value.

The present invention thirdly intends to provide a fuel cell apparatus in which the pressure increasing time in the gas discharge tube in starting of the fuel cell, that is, the time necessary until the pressure in the gas discharge tube reaches the predetermined value, can be shortened.

1) In order to achieve the first object, in the first embodiment of this invention, in a fuel cell apparatus comprising a fuel cell provided with an air supply tube cell and a gas discharge tube, a compressor disposed on the air supply tube, an electric motor for driving the compressor, an expander disposed on the gas discharge tube to be coaxial with said electric motor for expanding a discharge gas discharged from said fuel cell down to an atmospheric pressure, a clutch is disposed between the electric motor and the expander for interrupting the expander from the electric motor, and a control means for controlling the clutch is provided. This control means detects a pressure in the gas discharge tube between said fuel cell and said expander to interrupt said clutch as long as a detected pressure is lower than a predetermined value.

In the second embodiment of this invention, in the above fuel cell apparatus, a one-way clutch is disposed between said electric motor and said expander and idly rotates as long as the number of rotations of said expander is smaller than the number of rotations of said electric motor.

According to this invention, since the expander is connected to the electric motor via the clutch or one-way clutch, the electric motor and the expander are separated by interruption of the clutch or by the one-way clutch, until the pressure in the gas discharge tube reaches the predetermined value.

2) In order to achieve the second object, in the first embodiment, in a fuel cell apparatus comprising a fuel cell provided with an air supply tube cell and a gas discharge tube, a compressor disposed on the air supply tube, an electric motor for driving the compressor, an expander disposed on the gas discharge tube to be coaxial with said electric motor for expanding a discharge gas discharged from said fuel cell down to an atmospheric pressure, a clutch is disposed between said electric motor and said expander for connecting said expander with said electric motor, and a control means for controlling said clutch is provided. This control means detects a pressure in the gas discharge tube between said fuel cell and said expander to connect said clutch when the detected pressure becomes larger than the predetermined value.

In the second embodiment, in the above fuel cell apparatus, a one-way clutch is disposed between said electric motor and said expander for transmitting rotation of said expander to said electric motor and rotating together with said expander when the number of rotations of said expander becomes equal to the number of rotations of the electric motor.

According to this invention, by lapse of short time after starting of the fuel cell, the expander is connected with the electric motor and the compressor by the clutch or by the one-way clutch. As a result, the pressure energy of the discharge gas is collected as the mechanical energy by the expander so that the mechanical energy (driving force) is used to assist driving of the compressor.

3) In order to achieve the third object, in the first embodiment, the clutch disposed between the electric motor and the expander is interrupted so that no atmosphere is introduced into the gas discharge tube even when the pressure of the gas discharge gas is lower than the predetermined value; in the second embodiment, the one-way clutch disposed between the electric motor and the expander idly rotates so that no atmosphere is introduced into the gas discharge tube even when the number of rotations of the expander is smaller than that of the electric motor.

According to this invention, as long as the pressure of the gas discharge tube is below the predetermined value or the number of rotations of the expander is smaller than that of the electric motor in starting of the fuel cell, the atmosphere is not introduced into the gas discharge tube (as mentioned above, the clutch or the one-way clutch is interrupted at this time). As a result, pressure increase of the discharge gas in the gas discharge tube is promoted, so that the power assist of the compressor and the electric motor by the expander starts quickly.

PREFERRED EMBODIMENT OF THE INVENTION

Next, preferred embodiments of the fuel cell apparatus according to the present invention will be explained in detail with reference to attached drawings. It is noted however, the present invention is by no means limited to these embodiments, but includes various modification or deformation within the sprit thereof.
<First Embodiment>

Figure 1:
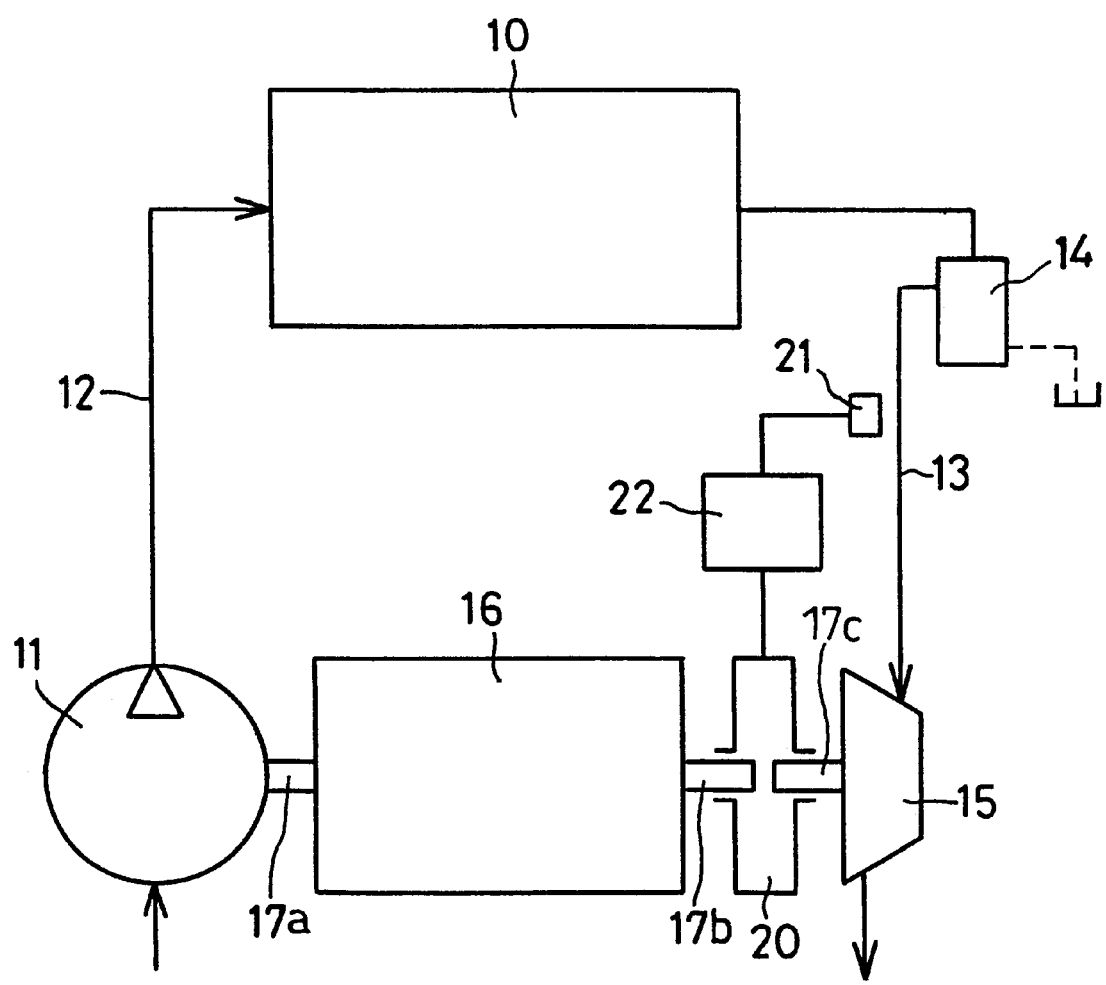
FIG. 1 is an explanatory view of a first embodiment of the fuel cell apparatus according to the present invention.
Figure 2:
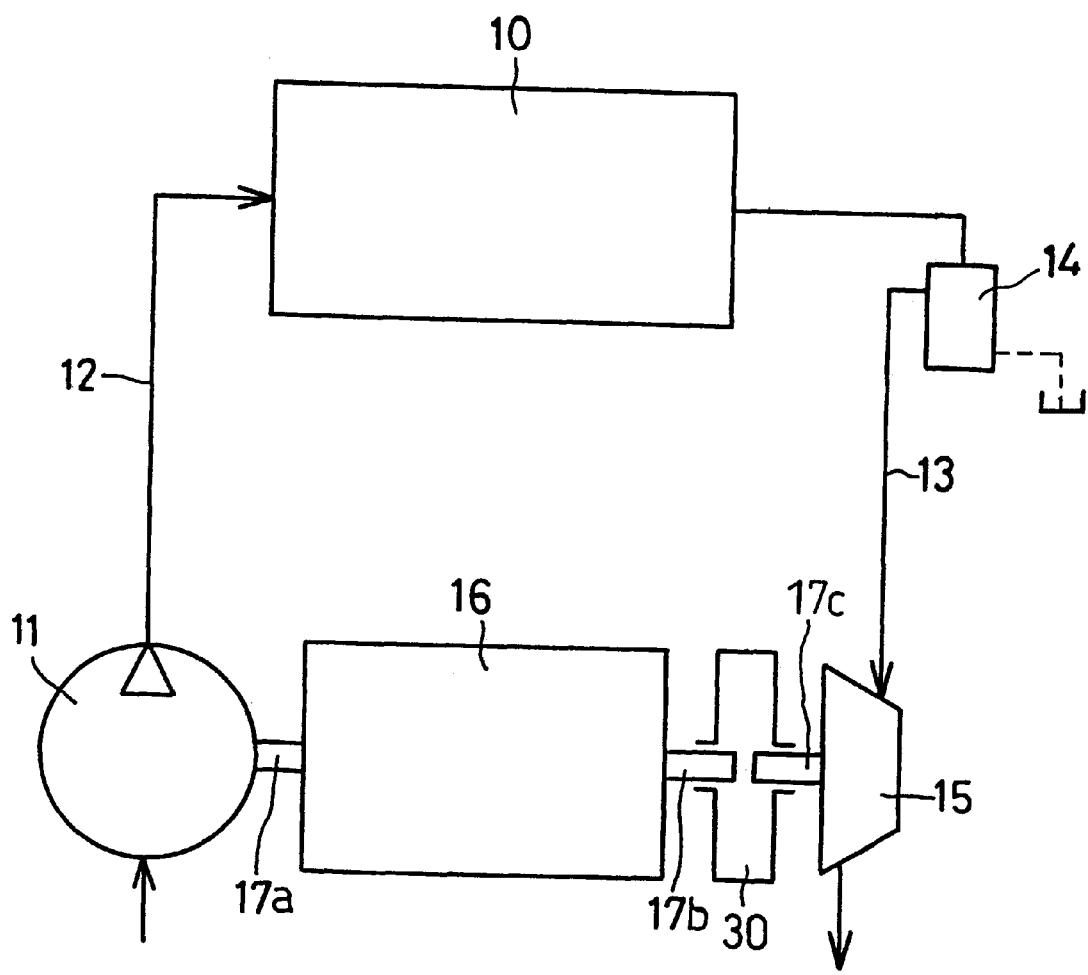
FIG. 2 is an explanatory view of a second embodiment of the fuel cell apparatus according to the present invention.

A first embodiment of the present invention will be explained based on the FIG. 1.

A fuel cell apparatus of this embodiment is comprised of a fuel cell 10 provided with an air supply tube 12 and a gas discharge tube 13, a compressor 11 disposed on the air supply tube 12, an expander 15 disposed on the gas discharge tube 13, and an electric motor 16 for driving the compressor 11.

In the fuel cell 10, as is well known, a positive electrode and a negative electrode are disposed at both sides of an electrolyte so that they constitute a layer. To the fuel cell 10, a process air is supplied through the air supply tube 12 by the compressor 11, and this process air passes through a positive electrode space of the fuel cell 10, and then is discharged through the gas discharge tube 13. The compressor 11 is disposed coaxially with the electric motor 16, and is connected thereto by a common shaft 17a. To a negative electrode space of the fuel cell 10, a hydrogen or a gas which contains an improved-quality hydrogen is supplied through a fuel supply passage (not shown), and by reaction of the hydrogen with an oxygen contained in the process air in the fuel cell 10, a created water and reacted heat are generated in addition to an electric energy. Thus, the discharge gas which contains much vapor is discharged from the fuel cell 10 through the gas discharge tube 13.

The discharge gas is, after being removed the water contained therein at a water separate device 14 disposed on the gas discharge tube 13, introduced into an expander 15 to collect a pressure energy remained therein. This expander 15 is of known capacity variable type and is disposed coaxial with the electric motor 16, and is connected to the electric motor 16, via clutch disposed on common shafts 17b, 17c, according to the present invention.

As the clutch, a known electro-magnetic clutch 20 is used in this embodiment of which operation is controlled by a pressure sensor 21 disposed adjacent to the gas discharge tube 13 to sense the pressure value in the gas discharge tube 13, and a control device 22 which controls a drive current to the electromagnetic clutch 20 based on a detected pressure by the pressure sensor 21. The electro-magnetic clutch 20 is brought into an interrupted condition as long as the pressure in the gas discharge tube 13 detected by the pressure sensor 21 is lower than a predetermined value, such as just after the starting of the fuel cell 10, and does not transmit the driving force of the electric motor 16 to the expander 15. For this reason, the driving force of the electric motor 16 is not used for driving the expander 15, but is used only for driving the compressor 11. In addition, as long as the pressure in the gas discharge tube 13 is lower than the predetermined value, the expander 15 is idly rotated or in a non-operating condition, so the pressure in the gas discharge tube 13 increases in short time.

To the contrary, when the pressure in the gas discharge tube 13 becomes higher than the predetermined value, that is when some time passed after the starting of the fuel cell 10, the electro-magnetic clutch 20 is brought into the connected condition, to transmit the rotation of the expander 15 to the electric motor 16. In this way, the mechanical energy collected and converted by the expander 15 is transmitted, through the common shafts 17b and 17c, and the electromagnetic clutch 20, to the electric motor 16. Thus, the disadvantage in the conventional art that the driving force of the expander is transmitted to the electric motor as the negative torque can be avoided. In addition, the pressure in the gas discharge tube 13 increases from the pressure value lower than the predetermined value to the predetermined value in short time as mentioned above, which results in that the power assisting by the expander 15 for the compressor 11 starts quickly.

Figure 3:
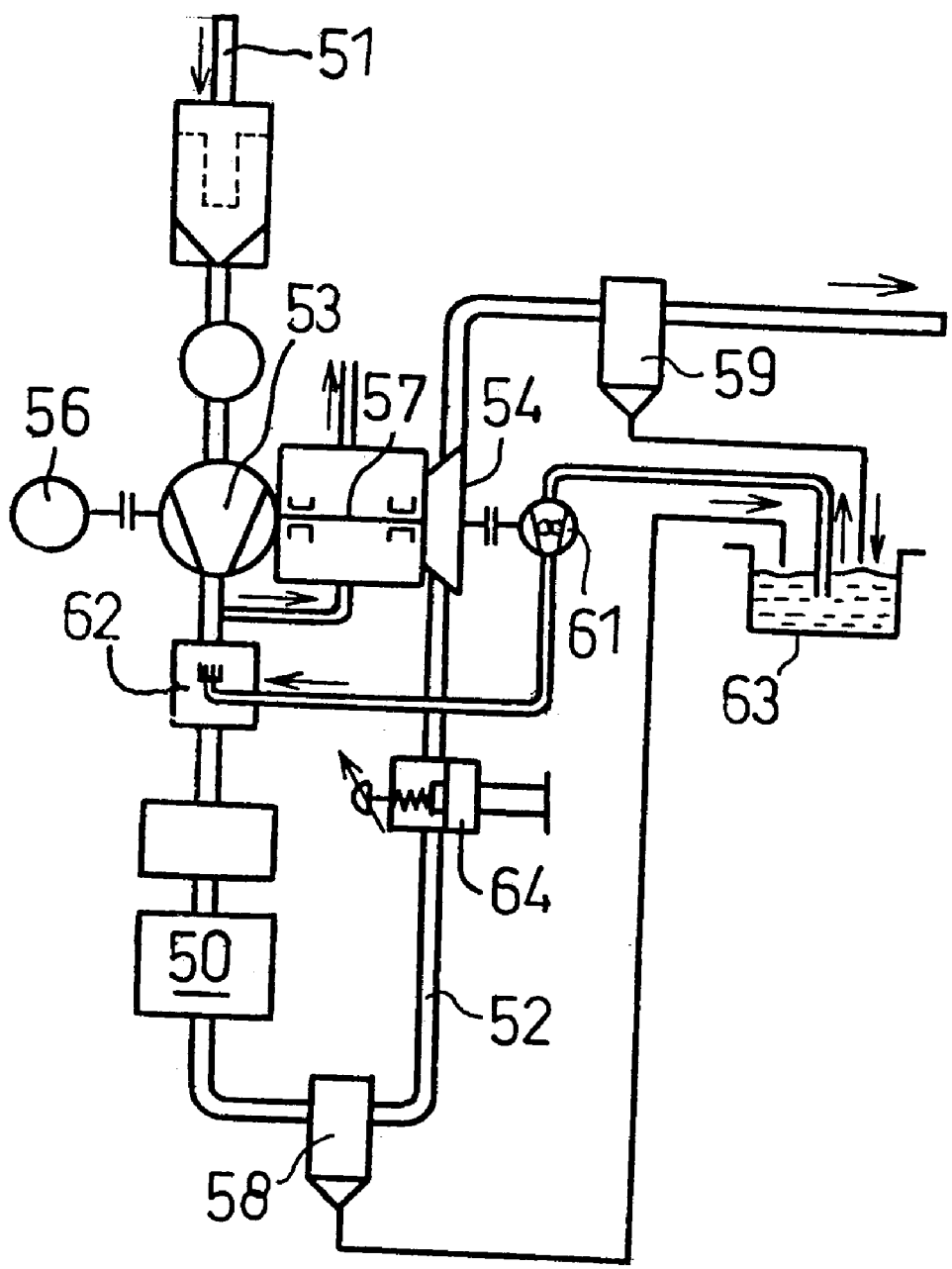
FIG. 3 is an explanatory view showing one example of the conventional fuel cell apparatus.

Operation of the electro-magnetic clutch 20 will be explained in detail. For example, when the compressor 11 is started by setting a compression ratio thereof as 3.0, and a commonly used number of rotation as 1500 rpm, the pressure in the air supply tube 12 increased to the predetermined level (3 atm) quickly. However, if like the conventional art (refer to FIG. 3) the expander 54 of which compression ratio is set as 2.5 is connected to the electric motor 56 and the compressor 53, the expander 54 positively rotated by the electric motor 56 absorbs the atmosphere through the swing plate valve 64, so that at least three minutes are required until the discharge gas in the gas discharge tube 52 reaches to the predetermined level (2.5 atm). During this time, the discharge gas expanded to the atmospheric pressure by the expander 54.

To the contrary, in this embodiment, the expander 15 is connected to the electric motor 16 via the electro-magnetic clutch 20, and is maintained in the interrupted condition by the pressure sensor 21 and the control device 22 until the pressure in the gas discharge tube 13 reaches the predetermined value. By such construction, the load of the expander 15 is not applied to the electric motor 16 rotating positively until the pressure in the gas discharge tube 13 reaches to the predetermined value, which results in the short pressure increasing time (about 5 sec.) of the pressure in the gas discharge tube 13.

<Second Embodiment>

In a second embodiment, a one-way clutch 30 which transmits the rotation of the expander 15 to the electric motor 16 under a particular condition, but does not transmit the rotation of the electric motor 16 to the expander 15 at any time is used. The one-way clutch 30 continues the idle rotation as long as the rotation speed of the rotation shaft 17c of the expander 15 is smaller than that of the rotation shaft 17b of the electric motor 16, but it rotates together with the rotation shaft 17 when the rotation speed of the rotation shaft 17c of the expander 15 becomes larger than that of the rotation shaft 17b of the electric motor 16b. Thus, the automatic rotation transmission from the expander 15 to the electric motor 16 is started.

In this embodiment, by paying attention to the relation between the pressure in the gas discharge tube 13 and the rotation start of the expander 15, that is the expander 15 starts rotation thereof when the pressure in the gas discharge tube 13 increases up to the predetermined value. In view of this, the one-way clutch 30 idly rotates or transmits the rotation of the expander 15 to the electric motor 16 corresponding to the number of rotations of the expander 15. As a result, the expander 15 can convert the pressure energy to mechanical energy and transmit it to the compressor 11 automatically to assist the driving of the compressor 11, after the pressure in the gas discharge tube 13 reaches the predetermined value. Thus, the pressure sensor 21 and the control device 22 in the first embodiment for controlling the electro-magnetic clutch 20 can be omitted, so that the whole construction of the fuel cell apparatus can be made simpler.

In addition, in this embodiment, the driving force of the electric motor 16 is by no means used for driving the expander 15, but is used only for driving the compressor 11 at any time.

What is claimed is:

1. A fuel cell apparatus, comprising:
   a fuel cell provided with an air supply tube through which an air is supplied to said fuel cell and a gas discharge tube through which a gas is discharged from said fuel cell;
   a compressor disposed on the air supply tube for compressing the air supplied therethrough to said fuel cell;
   an electric motor for driving said compressor;
   an expander disposed on the gas discharge tube to be coaxial with said electric motor, for expanding the discharge gas discharged from said fuel cell after an oxygen contained therein is consumed at said fuel cell down to about an atmospheric pressure;
   a clutch disposed between said electric motor and said expander for connecting/interrupting said expander with/from said electric motor; and
   a control means for controlling said clutch, said control means detecting a pressure in the gas discharge tube between said fuel cell and said expander, to interrupt said clutch as long as a detected pressure is lower than a value and to connect said clutch when the detected pressure becomes higher than the value.

2. A fuel cell apparatus according to claim 1, wherein said clutch is an electro-magnetic clutch.

3. A fuel cell apparatus according to claim 2, wherein said control means includes a pressure sensor for detecting the pressure in the gas discharge tube, and a control device for controlling a driving current to the electro-magnetic clutch based on a detected pressure by the pressure sensor.

4. A fuel cell apparatus according to claim 1, wherein the predetermined value of the pressure is a rating absorb pressure of said expander.

5. A fuel cell apparataus according to claim 4, wherein when the pressure in the gas discharge tube becomes higher than the rating absorb pressure of said expander, said expander is driven by the discharge gas to assist a power of said electric motor via said clutch.

6. A fuel cell apparatus according to claim 1, wherein no atmosphere is introduced into the gas discharge tube even when the pressure in the gas discharge gas is lower than the predetermined value.

7. A fuel cell apparatus, comprising:
   a fuel cell provided with an air supply tube through which an air is supplied to said fuel cell and a gas discharge tube through which a gas is discharged from said fuel cell;
   a compressor disposed on the air supply tube for compressing the air supplied therethrough to said fuel cell;
   an electric motor for driving said compressor;
   an expander disposed on the gas discharge tube to be coaxial with said electric motor, for expanding a discharge gas discharged from said fuel cell after an oxygen contained therein is consumed at said fuel cell down to about an atmospheric pressure; and
   a one-way clutch disposed between said electric motor and said expander for transmitting rotation of said expander to said electric motor and not transmitting rotation of said electric motor to said expander at any time.

8. A fuel cell apparatus according to claim 7, wherein said one-way clutch idly rotates as long as the number of rotations of said expander is smaller than the number of rotations of said electric motor, and rotates together with said expander when the number of rotations of said expander becomes equal to the number of rotations of the electric motor to transmit the rotation of said expander to said electric motor.

9. A fuel cell apparatus according to claim 7, wherein no atmosphere is introduced into the gas discharge tube even when the number of rotations of said expander is smaller than the number of rotations of said electric motor.

* * * * *

UNITED STATES PATENT AND TRADEMARK OFFICE
CERTIFICATE OF CORRECTION

PATENT NO. : 6,312,843 B1
DATED : November 6, 2001
INVENTOR(S) : Masahiro Kimbara et al.

It is certified that error appears in the above-identified patent and that said Letters Patent is hereby corrected as shown below:

<u>Title page,</u>
Item [56], References Cited, please add:
-- FOREIGN PATENT DOCUMENTS
07-14599 2/94 Japan --;

<u>Column 6,</u>
Line 26, please change
"cell apparataus according to" to -- cell apparatus according to --.

Signed and Sealed this

Seventeenth Day of February, 2004

JON W. DUDAS
*Acting Director of the United States Patent and Trademark Office*